United States Patent [19]

Okada

[11] Patent Number: 4,559,236

[45] Date of Patent: Dec. 17, 1985

[54] METHOD OF PREPARING FABRICATED MEAT PRODUCTS

[75] Inventor: Minoru Okada, Tokyo, Japan

[73] Assignee: Suzuhiro U.S.A., Inc., Los Angeles, Calif.

[21] Appl. No.: 662,081

[22] Filed: Oct. 18, 1984

Related U.S. Application Data

[63] Continuation of Ser. No. 451,478, Dec. 20, 1982, abandoned.

[51] Int. Cl.[4] .............................................. A23L 1/325
[52] U.S. Cl. ..................................... 426/643; 426/513; 426/517
[58] Field of Search ............... 426/104, 272, 643, 644, 426/646, 652, 513, 516, 517, 518, 657, 802

[56] References Cited

U.S. PATENT DOCUMENTS

| | | | |
|---|---|---|---|
| 3,615,686 | 10/1971 | Marshall | 426/646 X |
| 3,852,484 | 12/1974 | Cabot | 426/802 X |
| 3,852,487 | 12/1974 | Van Werven et al. | 426/646 X |
| 3,863,017 | 6/1975 | Yueh | 426/643 |
| 4,158,065 | 6/1979 | Sugino | 426/104 |
| 4,277,513 | 7/1981 | Rufer et al. | 426/646 X |
| 4,301,181 | 11/1981 | Simon et al. | 426/513 X |
| 4,362,752 | 12/1982 | Sugino et al. | 426/104 |
| 4,396,634 | 8/1983 | Shenouda et al. | 426/643 X |

FOREIGN PATENT DOCUMENTS

| | | | |
|---|---|---|---|
| 39059 | 11/1971 | Japan | 426/643 |
| 38187 | 4/1981 | Japan. | |
| 1518778 | 7/1978 | United Kingdom | 426/643 |

*Primary Examiner*—Arthur L. Corbin
*Attorney, Agent, or Firm*—William W. Haefliger

[57] ABSTRACT

This invention relates to imparting structural integrity and texture to fabricated meat products, particularly simulated crustacean and shellfish meat. Deboned meat, fish or poultry is ground with additives such as salt and suitable flavoring materials; the exposed surface area of the mass of meat paste is then enlarged, treated with acid, formed into a desired shape, and heated to set. The particular food products of the invention provide for utilization of deboned meat which has good nutritional properties but which lacks sufficient structural integrity and texture to function as a satisfactory food product.

6 Claims, 5 Drawing Figures

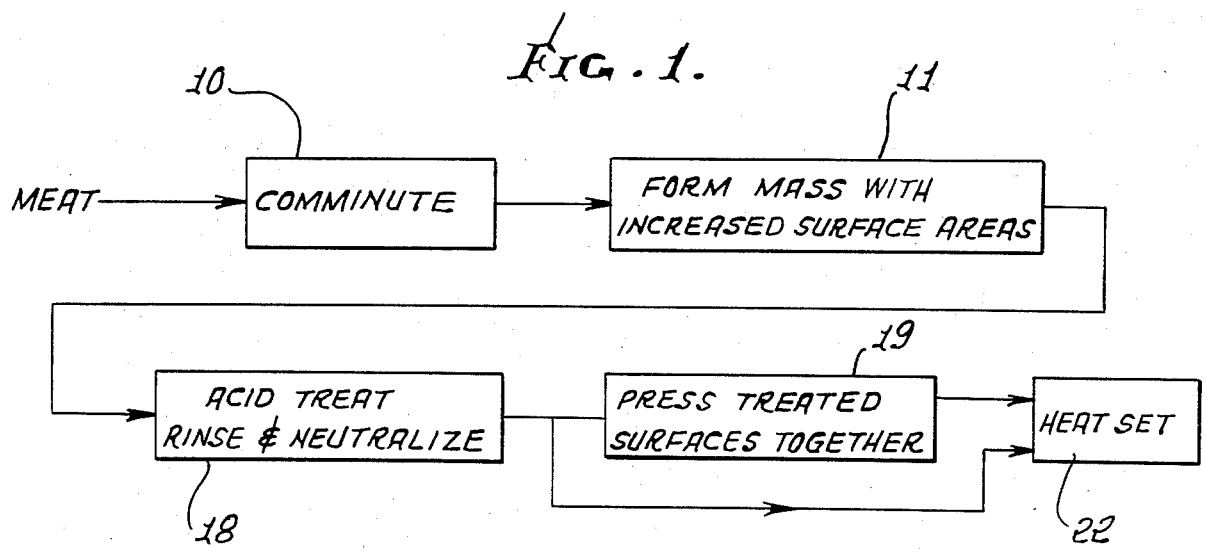
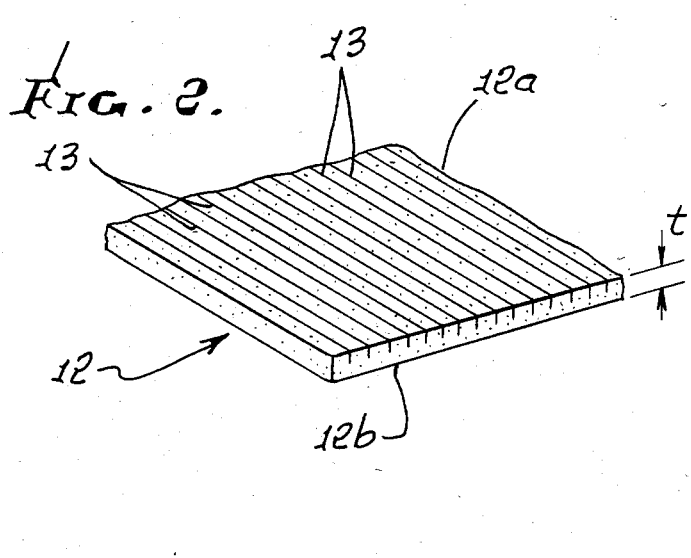
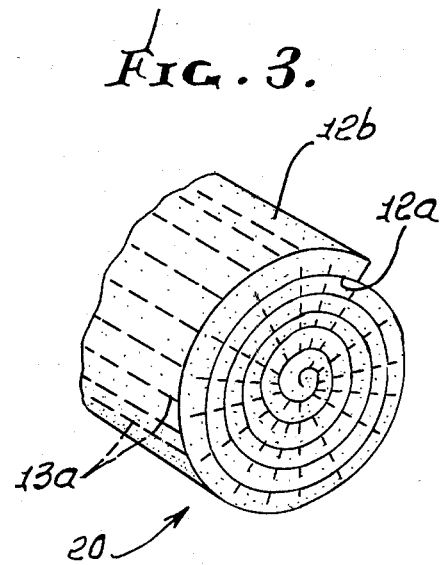
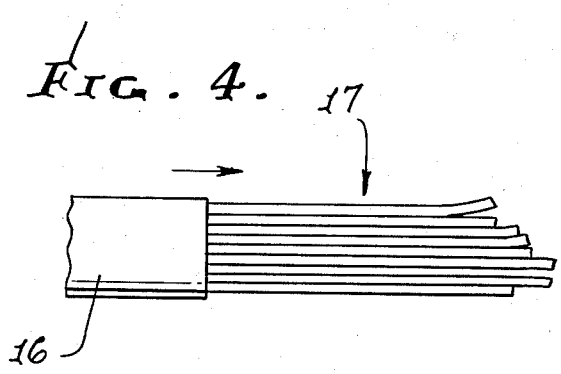
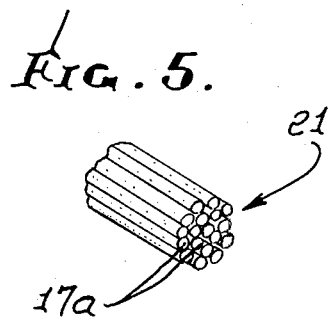

METHOD OF PREPARING FABRICATED MEAT PRODUCTS

This is continuation of application Ser. No. 451,478, filed Dec. 20, 1982, now abandoned.

BACKGROUND OF THE INVENTION

The present invention relates to a process for producing fabricated edible meat products, and in particular to a method of producing simulated meat of crab, lobster, shrimp or adductor muscle of shellfish with desirable texture and flavor, from mechanically deboned meat of fish or poultry.

The process of mechanically deboning of fish and poultry meat has received increasing attention during the last twenty years throughout the world in order to utilize efficiently nutritious proteinaceous resources, such as numerous underutilized marine species, fish trimmings and process wastes of cut-up chicken and processed turkey meat. The deboned meats are commonly comminuted to form Kamaboko, fish sausage, frankfurters, bologna, meat loafs and similar meat products having homogeneous texture. Many efforts have been made to produce more expensive, more acceptable fabricated products for human consumption from the mechanically deboned meat in order to upgrade the market acceptance. Among them, the most interesting and hopeful products are simulated meat of crab, lobster, shrimp, and adductor muscle of scallop.

U.S. Pat. No. 4,158,065 discloses a simulated crab meat molded product, Japanese Kamaboko, made from ground fish meat paste containing salt. The molded and crab flavored Kamaboko, which has jelly strength of 300 to 1500 g, is shredded into pieces ranging from 0.25 to 3.0 mm in width and up to 2.25 mm$^2$ in cross sectional area, i.e. to correspond to the dimensions of muscle fiber of crab. The shredded pieces are often blended with ground fish meat paste as a binder and formed to crab leg shape, and then heated to set, in order to prepare a fabricated crab leg.

Japan Patent Publication No. 38,187/1981, discloses a fabricated sea food product prepared from minced fish meat ground with salt and suitable flavoring materials. The ground meat is shaped in the form of a thin film and cooked to set. It is then shredded to form strips and rolled up as a bar to resemble crab leg meat or scallop adductor muscle.

The Japanese restructured meat products made according to these patented processes simulate crab or scallop meat in appearance and in flavor; but their textures are quite different from those of real crab or scallop meat because such textures are undesirably elastic and the products have undesirably rubbery bite characteristics. Further, such products commonly do not have sufficient structural integrity to retain the shredded pieces together as a unit.

U.S. Pat. No. 3,863,017 discloses a fabricated sea food product prepared from comminuted fish meat and fish muscle fibers. Loose fibers are prepared by partially cooking fish meat. In addition, fresh fish meat is finely comminuted to a coagulable paste. The loose fibers and the paste are mixed and formed into desired shape. The shaped product is then heat set. The product is dry, lacking in succulence and has less cohesiveness than the above described simulated sea food products.

SUMMARY OF THE INVENTION

The present invention is directed to fabricated meat products, especially simulated meat of crab, lobster, shrimp or adductor muscle of shellfish, with desirable texture and flavor, from mechanically deboned meat of fish and poultry.

In the method, mechanically deboned meat or fish or poultry is comminuted with additives such as salt, suitable flavoring materials, seasoning and other ingredients, to form sticky paste. The paste mass is notched on its surface, or cut into slices or strips, or is extruded into fibers, in order to increase its surface area. Simultaneously or immediately after the surface increasing treatment, the paste surface is treated with an acid solution by being dipped or sprayed. The acid treated paste is washed with water and neutralized with an alkaline solution, and then formed into a desirable shape and cooked to set.

The formed meat product is a structurally coherent meat product without need for an added extraneous binder and has excellent flavor with textural resemblance to crustacean or shellfish meat. The particular texture is imparted by partial denaturation of myofibrillar proteins, with combination action of salt in the ground meat paste and treating acid, before the heat treatment.

These and other objects and advantages of the invention, as well as the details of an illustrative embodiment, will be more fully understood from the following specification and drawings, in which:

DRAWING DESCRIPTION

FIG. 1 is a flow diagram;
FIG. 2 is a perspective view of a meat mass which has been notched;
FIG. 3 is a perspective view of the FIG. 2 mass, after spiral rolling;
FIG. 4 is an elevation showing extrusion of meat strings; and
FIG. 5 is a perspective view of the FIG. 4 meat strings after they have been sidewardly pressed together.

DETAILED DESCRIPTION

Blending muscle in neutral salt solution of an ionic strength of 0.3–1.0 results in the extraction of all myofibrillar proteins together with sarcoplasmic proteins. On cooking, the extracted myofibrillar proteins form a three dimensional network structure, i.e., set to an elastic gel. In preparation of Kamaboko, fish meat is comminuted with 2–5% salt by weight of the meat and forms a sticky paste, a concentrated solution of myofibrillar proteins. On being cooked the paste sets to a very elastic gel with excellent cohesiveness, water retention as well as very rubbery bite characteristics, which are very important and appreciable textural characteristics of Japanese Kamaboko.

In the process of the U.S. Pat. No. 3,863,017 above mentioned, the fish binder is prepared by comminuting fish meat without salt, and myofibrillar proteins are not extracted. The product is, therefore, dry and less cohesive.

Cohesiveness, waterholding capacity, emulsifying ability, binding capability, elasticity, and rubbery bite characteristics of the minced meat products are deeply related to each other.

The addition of salt to comminuted meat is not desired in the preparation of a fabricated protein food on account of resultant rubbery bite characteristics. On the other hand, salt is very effective in preparing a cohesive, well bound product. The present invention obviates the unacceptable rubbery bite characteristics of minced meat products, while retaining optimal cohesion, water holding capacity and other textural characteristics resembling those of crustacean or shellfish meat, through the use of partial denaturation of myofibrillar proteins by the combined action of salt and acid.

Myofibrillar proteins become inextractable in salt solution in the pH range below 6. The diminution in extractability is associated with protein denaturation. When the pH of ground meat paste with salt is lowered below 6 by the addition of acid during comminution, the paste loses stickiness and results in a dry, hard product of poor texture on being cooked. This is caused by uniform denaturation of myofibrillar proteins throughout the ground meat paste by the cooperative action of salt in the paste and added acid. However, when a mass of ground meat paste with added salt is treated with acid for a short time by such treatment as dipping in an acid solution bath, and is not mixed further uniformly, the meat product obtained on cooking has a white and hard surface and rubbery bite characteristics very similar to those of Kamaboko. This is due to the fact that a very limited part of the mass, i.e. only the surface part, (a small amount of protein), is denatured by action of acid and salt, the proteins at the inside of the mass remaining uneffected.

In accordance with the present invention, it is found that a less rubbery product having good juiciness and excellent bite characteristics very similar to those of crustacean or shellfish meat can be prepared from ground meat paste of which the surface area has been enlarged and then treated with acid in order to increase the amount of denatured proteins. The surface area of the ground meat paste may, for example, be enlarged by such means as making notches thereon or cutting slices or strips, or extruding the mass through a nozzle to form strips or ribbons. Simultaneously or immediately after the surface area is increased, the meat is brought into contact with an acid solution to denature the meat proteins at the mass surfaces contacting the acid solution.

In the implementation of the present invention, ground meat paste may be prepared by finely comminuting deboned meat in any type of apparatus that will form a fine mince, and meat proteins will dissolve by the action of added salt. Examples of apparatus that have been found to work satisfactorily are a cutter mixer for sausage preparation and a stone mortar widely used in Japanese Kamaboko plants. During the comminuting step, the meat material is preferably maintained at a reduced temperature such as below 20° C. It is preferred to add salt (sodium chloride) to the meat in an amount of from 1.0 to 10 percent, and preferably and most desirably 2.0 to 3.5 percent (for best results) by weight of the meat. Other desirable ingredients may be added such as flavoring, seasoning and coloring materials, starch, egg white, etc. For example crab meat flavoring can be added to fish meat paste.

The surface area of a mass of ground meat paste may be increased by forming notches on the mass, cutting it into slices or strips by a knife, or by extruding it through a nozzle. The acid treatment may be carried out simultaneously with, or immediately after, the surface increasing treatment. The acid treatment may be effected by such means as dipping the meat paste in an acid solution bath or spraying acid solution onto the meat paste. Acids used for treating the ground meat paste may include organic and inorganic acids which are inexpensive, free of unpalatable taste and safe from the food hygienic point of view. Examples of usable organic acids are acetic, lactic, citric, glutamic, succinic, fumalic, and maleic acid. Inorganic acids which may be used include hydrochloric and phosphoric acids. Acidic salts such as monosodium phosphate and monosodium fumarate may be also used. The concentration of acid solution is for best results between 0.05–1.5 mols. If the concentration of the acid solution is too low, the denaturation of myofibrillar proteins is not sufficient and results in a meat product with rubbery bite characteristics on being cooked. On the other hand, if the concentration of acid is too high, the ground meat paste swells to dissolve. Duration of acid treatment may be 10 to 120 seconds, typically 20 to 60 seconds.

It is possible to suitably change the texture, mouthfeel, and bite characteristics of the fabricated meat products by varying the amount of salt mixed with the meat, the surface area of the ground meat paste, the concentration of the acid solution, and the duration of contact of the meat paste with the acid solution.

After contact with acid solution, the surface of the meat paste may have reduced stickiness and plasticity, and the acid treated meat paste particles may not coalesce and retain the shape of particles during handling them in the following processing steps. The acid treated meat paste particles may, however, be washed with cold water to remove excess acid on their surfaces by immersing them in water or spraying with water.

The thus washed meat paste particles may be further immersed in an alkaline solution bath, or be sprayed with a weak aqueous alkaline solution, to neutralize the still remaining acid. Such alkalis as sodium bicarbonate, sodium carbonate and trisodium phosphate may be used.

The neutralized meat paste slices, strings or particles may be formed into any desired shape. This may be done by placing them in a suitable mold or by bundling or rolling them up to any desired shape. The shaped paste may then be heat set in an steam chamber, in a deepfat fryer or in an oven, typically at a temperature of 70° to 90° C. for between 5 and 60 minutes. On being heat set, the paste particles soldify and coalesce each other to that degree which holds the mass together to the given shape. No supplemental binders or adhesives are needed to cohere the paste particles.

The fabricated products obtained by the present invention are of an enhanced structural integrity and texture while retaining the structure of the particle components, and have a desirable degree of bite resistance very similar to that of crustacean and shellfish meat.

The following examples further illustrate various features of the invention, but are intended to in no way limit the scope of the application, which is defined in the appended claims:

EXAMPLE 1

Meat paste ground with salt was prepared by adding 30 g of salt, 12 g of glycine, 5 g of alanine, a small amount of artificial lobster aroma and 200 g of cold water to 1 kg of deboned cod meat and grinding them thereafter in a small stone mortar.

A flat mass of the ground meat paste was immersed in a 3% citric acid solution for 5 seconds, and then placed on a chopping board and stretched thereon to a thin sheet of about 3 mm thickness while the acid solution was continuously sprayed thereover and at the same time notches were formed with a knife in parallel and 3–5 mm spaced apart from each other. After washing with cold water, 0.5% sodium carbonate aqueous solution was sprayed over the surface of the sheet. The sheet was rolled up in the form of a bar of 3 cm in diameter and 10 cm in length with the notches extending in the axial direction, and then steam-heated for 30 minutes at a temperature of 80° C., and cooled thereafter. The above process gave a product resembling lobster tail meat having a moderate firmness and with agreeable bite characteristics.

EXAMPLE 2

Meat paste ground with salt was prepared by adding 30 g of salt, 12 g of glycine, 5 g of alanine, and a small amount of artificial lobster aroma to 1 kg of deboned chicken meat which was washed with cold water three times, and ground thereafter in a small silent cutter. The meat paste was stretched to form a sheet of 0.5 cm thickness, cut into strings of 3–5 mm width and 4 cm length with a knife moistened with 3% acetic acid solution, dropped immediately thereafter into a bath of the same acid solution and immersed therein for 30 seconds. Then, after washing out the attached acid solution from the strings in running water, they were immersed in a hot water bath at a temperature of 90° C. and set. Fibrous meat product similar to lobster tail meat flakes was obtained, with desirable bite and textural characteristics.

EXAMPLE 3

Meat paste ground with salt was prepared by adding 35 g of salt, 12 g of glycine, 5 g of alanine, 7 g of arginine hydrochloride, a small amount of crab extract and artificial aroma and 400 g of cold water to 1 kg of frozen Alaska pollack surimi and ground thereafter in a small silent cutter. The ground meat paste thus obtained was put into an extruder for fish meat noodles and extruded from a nozzle, having plate perforations of about 1 mm diameter, into the shapes of fibers. The latter were passed into a 3% citric acid solution and were allowed to stand therein for about 30 seconds. After being thereafter lightly washed in cold water, they were immersed in a 2% sodium bicarbonate solution for 30 seconds for neutralization. They were then collected together in bundles, each bundle containing several dozens of fibers. Each of the bundles were lightly pressed sidewardly so that the fibers of the meat paste were laterally bonded together, and then heated at 80° C. by steaming. The obtained product was coherent, and resembled crab leg meat, having parallel-oriented fibrous textures, being moderately firm and providing agreeable mouthfeel and bite characteristics.

In the drawings, FIG. 1 shows at 10 the communition of meat to form a mass. The mass is then formed, as at 11, to have substantially increased exposed surface area. FIG. 2 shows the mass in the form of a sheet 12, with increased surface area provided by notching or slicing the sheet to form strands. Multiple, close-together slices 13 are typically formed, the slices extending from upper flat surface 12a toward lower flat surface 12b, but not reaching lower surface 12b which therefore remains continuous. By way of example, the notches or slices 13 extend into the sheet dimensionally between 40% and 90% of its thickness "t". FIG. 4 shows another method of increasing the exposed surface area, an extruder 16 extruding the meat paste mass to form meat paste strings or strands 17 which are longitudinally elongated.

Returning to FIG. 1, the thus increased surface areas are treated with an acid solution at 18 as described above, as by dipping or spraying of the FIG. 2 and FIG. 4 forms. The treated surface areas are then rinsed with water and neutralized as described above.

Thereafter, the extended surface mass is deformed to press together the treated surface areas, as at 19 in FIG. 1. In the example of FIGS. 2 and 3, the sheet 12 is spirally rolled to press together the treated surfaces of the strands at opposite sides of the slices or notches 13, the resultant roll shown in FIG. 3. Note that undisturbed side 12b faces outwardly, whereas sliced surface 12a faces inwardly. The pressed together treated surfaces (now located internally of the roll) provide the desired texture, and are distributed substantially uniformly throughout the deformed (i.e. reformed) mass 20 of the roll. In FIGS. 4 and 5, the longitudinally elongated strings 17 are laterally, i.e. sidewardly, pressed together to form a cohesive mass 21, again with treated surfaces 17a located internally of the mass, to provide desired (non-rubbers) muscle fiber-like texture encountered by the consumer's teeth upon biting into to mass after ultimate heating. Such heating is shown at 22 in FIG. 1 and is referred to above, to cause the pressed together surfaces to bind, molecularly. Note in both FIGS. 3 and 5 that the treated surfaces extend lengthwise (indicated at 13a in FIG. 3) as in a crab leg, for example.

I claim:

1. In the method of processing fish paste to form a fish product, the steps comprising:
    (a) forming a coherent mass of the fish paste to have increased exposed elongated surface areas in the form of elongated strands extending in side-by-side relation,
    (b) treating only said surface areas with an acid solution for a time interval between 10 and 120 seconds, to denature the fish paste, the acid solution having a concentration between 0.05 and 0.5 mols and consisting of an aqueous solution wherein the acid is selected from the group consisting of acetic, lactic, citric, glutamic, succinic, fumaric, maleic, hydrochloric and phosphoric,
    (c) rinsing said acid treated surface areas with water and substantially neutralizing said surface areas by contacting said surface areas with an aqueous alkaline solution wherein the alkali is selected from the group consisting of sodium bicarbonate, sodium carbonate and trisodium phosphate,
    (d) deforming the mass to press together said elongated surface areas and distribute them substantially uniformly throughout the mass, and then
    (e) heating the thus deformed mass at between 70° C. and 90° C. for 5–60 minutes.

2. The method of claim 1 wherein step (a) includes notching said mass.

3. The method of claim 2 wherein said formed mass is sheet-like, and step (d) includes rolling the sheet like mass.

4. The method of claim 1 wherein step (a) includes extruding said mass to form longitudinally elongated strips.

5. The method of claim 4 wherein step (d) includes laterally pressing said elongated strips together to form a cohesive secondary mass.

6. The process for producing an edible fish product resembling lobster tail meat having a moderate firmness and with agreeable bite characteristics, comprising the steps of: grinding and mixing A kilograms of deboned fish meat with B g of salt, C g of water, D g of glycine, E g of alanine, and a small amount of artificial lobster aroma to produce a fish paste, immersing a flat mass of the ground fish paste in approximately 3% aqueous citric acid solution for about 5 seconds to contact only surface areas of the mass with said acid solution; stretching the mass to a thin sheet of about 3 mm thickness while continuously spraying the acid solution thereover to contact only surface areas thereof, and simultaneously forming generally parallel notches in the thin sheet at intervals of about 3 to 5 mm; washing the notched sheet with cold water spraying approximately 0.5% aqueous sodium carbonate solution over the surface of the sheet rolling the sheet into the form of a bar about 3 cm in diameter with the notches extending in the length direction of the bar steam-heating the bar for about 30 minutes at a temperature of about 80° C.; and then cooling the bar, wherein A, B, D, C and E have about the following relative weights:

A=1,000
B=30
C=200
D=12
E=about 5.

* * * * *